(12) United States Patent
Frenier et al.

(10) Patent No.: US 7,427,584 B2
(45) Date of Patent: *Sep. 23, 2008

(54) TREATING COMPOSITION

(75) Inventors: Wayne Frenier, Katy, TX (US); Mark Brady, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 311 days.

This patent is subject to a terminal disclaimer.

(21) Appl. No.: 10/253,962

(22) Filed: Sep. 24, 2002

(65) Prior Publication Data

US 2003/0104950 A1 Jun. 5, 2003

Related U.S. Application Data

(60) Provisional application No. 60/335,631, filed on Oct. 25, 2001.

(51) Int. Cl.
*C09K 8/528* (2006.01)
*E21B 33/00* (2006.01)
*E21B 37/00* (2006.01)
*E21B 37/08* (2006.01)
*C09K 8/60* (2006.01)

(52) U.S. Cl. .................. 507/241; 507/260; 507/261; 507/922; 507/927; 507/928; 166/312

(58) Field of Classification Search .......... 507/241, 507/260, 261, 922, 927, 928; 166/312
See application file for complete search history.

(56) References Cited

U.S. PATENT DOCUMENTS

| | | | | |
|---|---|---|---|---|
| 4,235,734 A | | 11/1980 | Scherubel | 252/142 |
| 4,426,303 A | | 1/1984 | Nuckels et al. | 252/8.55 |
| 4,487,265 A | * | 12/1984 | Watanabe | 166/307 |
| 4,949,790 A | * | 8/1990 | Dill et al. | 166/307 |
| 5,008,026 A | * | 4/1991 | Gardner et al. | 507/235 |
| 5,126,059 A | * | 6/1992 | Williamson | 507/241 |
| 5,622,921 A | * | 4/1997 | Dyer | 507/259 |
| 5,710,111 A | * | 1/1998 | Van Slyke | 507/137 |
| 5,909,774 A | * | 6/1999 | Griffith et al. | 166/312 |
| 6,165,947 A | * | 12/2000 | Chang et al. | 507/216 |
| 6,225,261 B1 | * | 5/2001 | Brezinski et al. | 507/90 |
| 6,436,880 B1 | | 8/2002 | Frenier | 507/244 |
| 2002/0119902 A1 | | 8/2002 | Harrison et al. | 510/424 |
| 2002/0123451 A1 | | 9/2002 | Manske et al. | 510/463 |

FOREIGN PATENT DOCUMENTS

| | | |
|---|---|---|
| WO | 00/70186 | 11/2000 |
| WO | 00/73620 | 12/2000 |
| WO | 01/83639 | 11/2001 |

OTHER PUBLICATIONS

*Inhibiting HCl Corrosion of High Chrome Tubular Steels.* Corrosion-Paper No. 188, by Raymond Jasinski, Wayne W. Frenier and Sharon Grannan, (1988).
*Effect of Acidizing Additives on Formation Permeability During Matrix Treatments.* SPE 73705 by Wayne W. Frenier and Donald G. Hill, (2002).
*Reduced Adsorption and Emulsion Tendencies in Sandstone Formation Through the Use of Ethoxylates.* SPE 21011 by J. Paktinat, (1991).
*Adsorption and Chlorination of Mutual Solvents Used in Acidizing.* SPE 14432 by G.E. King, R.M. Lee, (1988).
*Aspects of Acid Additive Selection in Sandstone Acidizing.* SPE 4114 by Gary D. Sutton and R.M. Lasater, (1972).
*Effect of Acid Corrosion Inhibitors On Matrix Stimulation Results.* SPE 11119 by C.W. Crowe and S.S. Minor, (1985).
*Stimulation of Sandstone Formations with The Acid-Mutual Solvent Method.* SPE 3007 by John L. Gidley, (1971).
*Study of the Field Application of Sandstone Acidizing.* SPE 5693 by J.L. Gidley, J.C. Ryan and T.D. Mayhill, (1976).

* cited by examiner

*Primary Examiner*—Daniel S Metzmaier
(74) *Attorney, Agent, or Firm*—Thomas O. Mitchell; David Cate; Robin Nava

(57) ABSTRACT

Treating compositions containing mutual solvents suitable for forming and maintaining single-phase aqueous fluid treating compositions containing very high concentrations of acids and/or chelating agents are described. Methods of use of these treating compositions for dissolving and removing scale and formation matrix material in oil-field treatments such as stimulation and remediation are given.

24 Claims, No Drawings

TREATING COMPOSITION

REFERENCE TO RELATED PROVISIONAL APPLICATION

This application claims the benefit of provisional application Ser. No. 60/335,631 filed Oct. 25, 2001.

TECHNICAL FIELD OF THE INVENTION

This Invention relates to treating compositions containing mutual solvents and their use in oil-field treatment fluids. More particularly it relates to treating compositions containing mutual solvents suitable for forming and maintaining single-phase aqueous fluid compositions containing high concentrations of acids or chelating agents and to their use in dissolving and removing scale and formation matrix material.

BACKGROUND OF THE INVENTION

In many industrial applications it is necessary to remove or dissolve salt deposits (scale) from surfaces. In oil-well stimulation processes it is sometimes necessary to dissolve a portion of the hydrocarbon-bearing rock formation. In some cases it may be necessary to dissolve scale on wellbore surfaces or in the formation, and a portion of the formation as well. In many cases it may be desirable to remove or dissolve as much material as possible with as limited an amount of treatment fluid (or treating composition) as possible. In many cases, the salt and/or formation may be difficult to dissolve. In many cases the salt and/or formation may be coated or at least partially coated with oil. When such oil might interfere with the process, the treatment fluid used to dissolve the salt and/or formation usually includes a mutual solvent. This is a component that is soluble in the treatment fluid but also miscible with the oil so that it causes the oil to be miscible with the treatment fluid and allows good contact of the dissolving component(s) of the treatment fluid with the salt and/or formation. The mutual solvent promotes water-wetting of surfaces such as minerals and metals and at least partial removal of hydrophobic materials such as oil-based muds, oils, paraffins and asphaltenes from the surface. This in turn promotes interaction of other components of the treatment fluid with the surface.

Substantially aqueous compositions are generally used to carry out these operations. Such compositions are usually made up of an acid, a chelating agent for the cation in the scale or formation, or both. When it is desirable to limit the volume of treatment fluid used and/or when the salt or formation is only sparingly soluble in the fluid, very high concentrations of acid and/or chelating agent are needed. Typical mutual solvents are multifunctional nonionic materials such as alcohols, glycols and glycol ethers, nonionic surfactants, and the like. Mutual solvents commonly used in industrial cleaners and oilfield treatments cannot form stable one-phase fluids in these treatment fluids that have very high concentrations of electrolytes.

There is a need for mutual solvents that form stable one-phase fluids in aqueous compositions containing very high electrolyte concentrations.

SUMMARY OF THE INVENTION

One embodiment of the invention is a one-phase treating composition that includes a first component that is either or both of a) an acid selected from the group consisting of hydrochloric, sulfuric, phosphoric, hydrofluoric, formic, acetic, boric, citric, malic, tartaric, and maleic acids and mixtures of those acids; and b) an aminopolycarboxylic acid chelating agent selected from the group consisting of ethylenediamine tetraacetic acid (EDTA), hydroxyethylethylenediamine triacetic acid (HEDTA), diethylenetriamine pentaacetic acid (DTPA), hydroxyethyliminodiacetic acid (HEIDA), nitrilotriacetic acid (NTA), and their K, Na, $NH_4$ or amine salts, and mixtures of those chelating agents. The second component of the treating composition is a mutual solvent selected from the group of compounds having the formula:

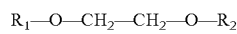

in which $R_1$ and $R_2$ are the same or different and are hydrogen, methyl, acetate, acrylate or ethyl provided that $R_1$ and $R_2$ are not both hydrogen and provided that the total number of carbons in $R_1$ and $R_2$ is not more than 2 if the first component includes an aminopolycarboxylic acid chelating agent,

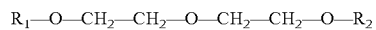

In which $R_1$ and $R_2$ are the same or different and are hydrogen, methyl, acetate, acrylate, or ethyl provided that $R_1$ and $R_2$ are not both hydrogen,

In which $R_1$ and $R_2$ are the same or different and are hydrogen, methyl, acetate, acrylate, ethyl, propyl or butyl provided that if $R_1$ is acrylate, ethyl, propyl or butyl then $R_2$ is hydrogen and provided that $R_1$ is hydrogen and $R_2$ is methyl or acetate if the first component includes an aminopolycarboxylic acid chelating agent,

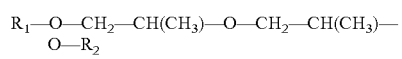

In which $R_1$ and $R_2$ are the same or different and are hydrogen, methyl, acetate, acrylate, ethyl, or propyl provided that if $R_1$ is propyl then $R_2$ is hydrogen and provided that $R_1$ is hydrogen and $R_2$ is methyl or acetate if the first component includes an aminopolycarboxylic acid chelating agent; and mixtures thereof.

Preferred embodiments include those in which the acid is a mixture of citric acid, hydrofluoric acid and boric acid; the aminopolycarboxylic acid is trisodium hydroxyethylethylenediamine triacetate; the pH is between about 2 and about 4; and the mutual solvent is dipropylene glycol methyl ether.

Other embodiments include processes using the treating composition for dissolving scale in well-bores and formations near well-bores, especially if the scale, well-bore or formation is at lest partially oil wet; processes using the treating composition for stimulating wells, especially acidizing or acid fracturing of carbonates and sandstones, especially when the formation is at least partially oil wet; processes using the treating composition for removing filtercakes from well-bores, especially when the filtercakes have been formed from oil-based muds that contain minerals that are only sparingly soluble in the absence of acid and/or chelant; and processes using the treating composition for removal of oil-based materials from surfaces.

DETAILED DESCRIPTION OF THE PREFERRED EMBODIMENT

We have found that certain substituted glycols and substituted glycol dimers may be advantageously used as mutual solvents in aqueous fluids containing very high concentrations of organic or inorganic acids, and/or aminopolycarboxylic acid chelating agents and their organic or inorganic salts. The compositions are used to remove oil-based materials from surfaces, especially when the materials contain solids not soluble or only sparingly soluble in the absence of an acid and/or chelating agent. By "oil-based" we mean any material that is at least substantially hydrophobic; non-limiting examples include crude oil, paraffins, asphaltenes, condensate, diesel oil, surfactants, vegetable oil, water-immiscible alcohol, and the like. By an-oil wet surface we mean a surface at least partially coated with an oil-based material. The compositions basically contain water, an acid or chelating agent or mixture of acids and chelating agents, and the mutual solvent. We will consistently use the term "acid" herein to refer to all suitable acids—except for aminopolycarboxylic acids—even if they are chelating agents, and the terms "chelating agent" or "chelant" to refer to all suitable aminopolycarboxylic acids or their salts, even though they may be acids. Many additives commonly found in such compositions may be included provided that they do not adversely affect the solubility of the mutual solvent in the mixture.

The tubulars present in a well often dictate the acid and/or chelant system required to achieve acceptable corrosion inhibition. The tendency of the high chrome steels to corrode excessively in hydrochloric acid compared to N80 steel and the effect of high chloride content on the integrity of the steel may result in the selection of lower strength acid or chelant treating compositions. It has been found that the effectiveness of corrosion inhibitors is increased by the use of the mutual solvents of the invention, relative to the effectiveness when other mutual solvents are used.

The water may be any available water including for example fresh or potable water, lake or river water, brackish water, brine and sea water. Two factors must be kept in mind in selection of the water. First, the water must not contain ions that would be incompatible either with any of the components of the composition or with its intended use. (Alternatively, if the water of choice contains a potentially deleterious ion, a control agent for that ion may be added.) Second, since the solubility of the mutual solvent in the composition depends in part on the total ionic strength, if the concentration of other ionic components needed is high, the ionic strength of the water may need to be limited. This may easily be tested by preparing a treatment fluid having the intended composition in a sample of the candidate water, mixing thoroughly, and then allowing the sample to stand under the conditions of use (time, temperature, etc.) and monitoring to ensure that phase separation does not occur.

The acid may be selected from mineral acids, other inorganic acids, and organic acids. The choice of the acid is based on the intended use of the composition. (For example, an acid must be chosen that will dissolve the salt or formation of interest and that will not release species that would then precipitate if that is not desired.) The acids may include polyacids and mixtures of different acids including their reaction products (for example, hydrofluoric acid reacts with boric acid to form fluoboric acid). Non-limiting examples of acids include hydrochloric, sulfuric, phosphoric, phosphonic, hydrofluoric, formic, acetic, boric, citric, malic, tartaric, and maleic acids. Again, one formulating the composition should ensure that the acid is compatible with all other components and suitable for the intended use of the composition, and should test to ensure that the final composition was a suitably stable single-phase fluid. Typically the acid concentration will range from about 2 to about 30 weight percent, preferably from about 7.5 to about 28 weight percent.

The chelating agent may be selected from aminopolycarboxylic acids such as the non-limiting examples ethylenediamine tetraacetic acid (EDTA), hydroxyethylethylenediamine triacetic acid (HEDTA), diethylenetriamine pentaacetic acid (DTPA), hydroxyethyliminodiacetic acid (HEIDA), nitrilotriacetic acid (NTA), and their K, Na, $NH_4$ or amine salts, and mixtures of these. When the term "aminopolycarboxylic acids" is used, it is intended to include the salts. Once more, one formulating the composition should ensure that the aminopolycarboxylic acid is compatible with all other components and suitable for the intended use of the composition, and should test to ensure that the final composition was a suitably stable single-phase fluid. Commonly the pH of the aminopolycarboxylic acid is adjusted to from about 2 to about 5 with HCl if the selected aminopolycarboxylic acid or salt is soluble at that pH, although the aminopolycarboxylic acid may be used at any pH at which it is soluble. Typically the aminopolycarboxylic acid concentration will range from about 5 to about 30 weight percent, preferably from about 10 to about 25 weight percent.

The concentration of the acid and/or the chelating agent may be suitably based upon the ease or difficulty of removal or dissolution of the scale and/or formation, the amount of the scale or formation, and the volume of treatment fluid that can be used. In the past, the concentration of acid and/or chelating agent might have had to be limited by the solubility of the mutual solvent in the fluid, especially if other components contributed to the total ionic strength.

Selection of the mutual solvent is based not on the intended use of the composition but on compatibility with (or solubility in) the remainder of the composition, that is, the capability of the composition to remain a single-phase fluid under the time and temperature conditions of use. We have found that many mutual solvents, for example the very commonly used ethylene glycol monobutyl ether, are not miscible with high ionic strength aqueous solutions of acids and/or chelating agents. Failure to use the proper mutual solvent can lead to deleterious effects in many treatments, for example it may lead to increased metal corrosion rates or to decreased formation stimulation efficiency.

Not to be limited by theory, but it is believed that which mutual solvents can be used advantageously under these demanding conditions is determined by the hydrophilic-hydrophobic balance (also known as the hydrophilic-lipophilic balance). This is related to the sizes, number and spatial distribution of the different moieties of the molecule that are attracted to and compatible with either water or oil. As the concentration and/or oil-like character of the acid and/or chelating agent in the composition increases, the number of candidate mutual solvent molecules that have the right structure diminishes. No precise rule can be given because the exact choice depends upon the exact formulation of the entire composition. Within the group of substituted glycols and substituted glycol dimers that has been identified, there are some that will be satisfactory with all the acids and chelating agents of the compositions described here, and some, for example, that are suitable with organic acids such as citric acid but not with aminopolycarboxyilic acids, or some that are suitable at any acid and/or chelant concentration and some for which there are upper acid and/or chelant concentration limits. All will be suitable for acid concentrations of up to about 20 weight percent and for aminopolycarboxylic acid concentrations of up to about 25 weight percent. The optimal mutual solvent choice or concentration may be determined by a minor amount of simple experimentation as was described above or as will be described in the examples. Typically the mutual solvent concentration will range from about 1 to about 10 volume percent of the treating composition, preferably about 5 percent. The concentration may be selected on the basis of a balance between the greater ability to render surfaces water-wet and to remove oil at increasing concentrations, the greater likelihood of interfering with the performance of certain additives such as corrosion inhibitors at higher concentrations, and cost. A particularly preferred mutual solvent is dipropylene glycol methyl ether.

The mutual solvents that have been found to be suitable are propylene glycol, dipropylene glycol, and the following substituted ethylene glycols, diethylene glycols, propylene glycols and dipropylene glycols. It is to be understood that isomers of any structures shown anywhere herein are suitable. Ethylene glycol and diethylene glycol themselves are not suitable. Ethylene glycol and diethylene glycol substituted on one or both hydroxyls with methyl, acetate, acrylate or ethyl are suitable. Propylene glycol and dipropylene glycol substituted on one or both hydroxyls with methyl, acetate, acrylate, ethyl, propyl or butyl are suitable (except for dipropylene glycol monobutyl ether) provided that if one hydroxyl is substituted with acrylate, ethyl, propyl or butyl the other hydroxyl is unsubstituted. If one component of the mixture is an aminopolycarboxylic acid, then the total number of carbons in groups substituted on the hydroxyl groups of ethylene glycol may not exceed 2. If one component of the mixture is an aminopolycarboxylic acid, then at least one hydroxyl must be unsubstituted and the other hydroxyl may be substituted with either methyl or acetate in propylene glycol and dipropylene glycol.

As will be recognized by those skilled in the art, the aqueous composition may contain other non-interfering additives in minor or major amounts, as is common in the use of such fluids. As utilized herein, the term "non-interfering" simply indicates that the component does not inhibit to a significant degree the single-phase nature of the composition or its stability or the function of the active components or ingredients in the methods of the invention. Additives that may be contained in the composition include but are not limited to corrosion inhibitors, iron control agents, reducing agents, surfactants, dispersants, non-emulsifying agents or emulsifying agents depending upon the intended mode of use, anti-sludging agents, friction reducers, clay stabilizers, gelling agents, viscosifiers, and foaming or non-foaming agents depending upon the intended mode of use. The composition often contains at least a corrosion inhibitor, a surfactant, an iron control agent and a reducing agent. As always, one formulating the composition should ensure by simple testing that additives are compatible and non-interfering.

The mutual solvent of the invention mixes readily into water or high concentration solutions of salts, acids, and/or chelating agents and so the components of the composition may be added at any time and in any order in the preparation of the final composition, and preparation may be by either batch or continuous mixing. Concentrates of one or more components may also be prepared in advance.

The treating composition may be foamed or energized, by non-limiting example with carbon dioxide, or may itself be the continuous or discontinuous phase of an emulsion. Formation of foams or emulsions will require suitable additives such as surfactants, and one formulating the composition should ensure by simple testing that any additives are compatible and non-interfering.

The compositions have many uses, including treatment fluids for industrial or household cleaning of surfaces. In the oilfield, uses include but are not limited to removal of scale from surface equipment and sub-surface well-bore tubulars; removal of oil-based muds or completion fluids, filter-cakes, diverting agents, or fluid loss control additives from well-bores, screens, formation surfaces, perforations, channels of lost circulation, and the like including cleaning of surfaces to which cement must adhere prior to cementing operations (in which cases the compositions may be or may be part of fluids called spacers or chemical washes); removal of scale, contaminants from drilling and/or completion, or naturally occurring materials in the near well-bore regions of formations that block flow-paths and reduce formation porosity and/or permeability; and removal of a portion of a formation itself in order to increase formation porosity and/or permeability. By formation surfaces we mean surfaces exposed or created in the formation in the wellbore by drilling or completion or away from the wellbore by perforation and by stimulation treatments such as fracturing or acidizing. Removal of oil-based materials from formation or metal surfaces surfaces is especially advantageous when such materials also contain minerals that are at best only sparingly soluble in the absence of acid or chelant. These various procedures may be performed prior to production (that is during completion) or after production has been accomplished or attempted (that is as a remedial or workover treatment). Although discussions herein are all in terms of hydrocarbon-producing wells, it is to be understood that the wells could be injection, disposal, or storage wells, or could be for the production of water, brine, carbon dioxide or other fluids.

In the use of the treating composition in spacers and chemical washes during cementing applications, the treating composition serves several functions. It is an aqueous fluid that effectively removes filter cake from the wellbore surface even if the filter cake is oil-based and contains minerals that are not soluble in the absence of acids or chelants. It also cleans the casing surface and ensures that both the casing and wellbore surfaces are clean and water wet so that the cement will bond effectively to both. The treating composition removes oily and solid residues from, by non-limiting example, oil-based drilling fluids, completion fluids, kill fluids and lost circulation fluids. It also removes filter cake or other deposits from the faces of fractures created by hydraulic fracturing or acid fracturing. The types of otherwise insoluble or only sparingly soluble materials, typically found in weighting and/or bridging agents, that are removed include as non-limiting examples, calcium carbonate, hematite, certain manganese oxides, and barite.

For use as a treating composition for removing scale or other forms of formation damage in a formation, or for removing a portion of the formation itself, a suitable sequence of steps is as follows. First, an optional preflush is injected that typically contains a formation-compatible brine such as 2 weight percent KCl or 5 percent ammonium chloride and may optionally contain a mutual solvent that may be the mutual solvent of this invention. Second, an optional diverting agent may be injected. Third a suitable volume of the composition of the invention is injected. There may then be an optional shut-in period. Finally, an optional postflush is injected that typically contains a formation-compatible brine. This treatment could, of course, be carried out in many different ways with this composition to achieve the desired results within the scope of the invention. For example, if the treatment is to remove scale from well-bore tubulars, the treating composition is recirculated out of the well and if the treatment is acid fracturing, the treating composition is injected at above formation fracture pressure. It is also within the scope of the invention to inject the treating composition several times during the course of a single treatment.

EXAMPLE 1

Dynamic core flood tests were run using the equipment and procedures shown and described in Frenier, et al., "Effect of Acidizing Additives on Formation Permeability During Matrix Treatments," SPE 73705, Feb. 20-21, 2002. Indiana Limestone cores (2.5 cm in diameter and about 15 cm long) were placed in a Hassler sleeve before being placed in the heated test chamber. The temperature of the tests was maintained at 177° C. The cores were preflushed with a 2 percent KCl solution and then a treating composition containing 20 weight percent Na$_3$HEDTA adjusted to a pH of 4 with HCl was injected. In different tests, different mutual solvents were also included. In each test in which a mutual solvent was included, 0.2 volume percent of a corrosion inhibitor that is a mixture of nitrogen quaternary compounds and sulfur compounds was also included. The flow rates were always 5 ml/min. A backpressure of 1000 psig was maintained to keep CO$_2$ in solution. The volume injected before break-through (V$_{bt}$) was determined from the onset of dramatic permeability increase, and the weight loss was determined by weighing the clean, dry cores before and after the tests.

The results are shown in Table 1.

TABLE 1

| Mutual Solvent. vol % | V$_{bt}$, ml | Weight Loss, g |
|---|---|---|
| None | 9.5 | 6.5 |
| Ethylene glycol monobutyl ether, 5% | 16.8 | 12.8 |
| Dipropylene glycol methyl ether, 10% | 10.0 | 5.9 |
| Blend of alcohol ethoxylate surfactants and ethylene glycol monobutyl ether, 5% | 12.0 | 10.4 |

It can be seen that the dipropylene glycol methyl ether was by far the best performer. Pore volume to breakthrough, which is a measure of treatment efficiency and should be as low as possible, was the lowest of the three mutual solvents and almost as low as with no mutual solvent at all. Weight loss, another measure of efficiency that should be as low as possible, was the lowest of all four tests when dipropylene glycol methyl ether was used. Note that the ethylene glycol monobutyl ether, a mutual solvent commonly used in the oil-field, was the worst. In separate tests in which 5 percent ethylene glycol monobutyl ether, 10 percent dipropylene glycol methyl ether, or 5 percent of the blend of alcohol ethoxylate surfactants and ethylene glycol monobutyl ether was each mixed into a solution of 20 weight percent Na$_3$HEDTA adjusted to a pH of 4 with HCl, the 10 percent dipropylene glycol methyl ether remained fully miscible after 24 hours at room temperature, whereas the 5 percent solutions of the other two mutual solvents each separated from the mixture within 1 hour. Note that even 10 volume percent of dipropylene glycol methyl ether performed better than 5 volume percent of either of the other two candidates tested. Although the experiment was not done, it is believed that 5 volume percent of dipropylene glycol methyl ether would have performed even better than did 10 volume percent in this test.

EXAMPLE 2

Surface tension is a convenient measure of the ability of mutual solvents to wet surfaces. Table 2 shows that 10 volume percent dipropylene glycol methyl ether reduced the surface tension of a fluid containing Na$_3$HEDTA about as much as ethylene glycol monobutyl ether reduced the surface tension of HCl. Concentrations of chelants are in weight %; concentrations of multiple solvents are in volume %; concentrations of HCl are in weight %.

TABLE 2

| Solution | Surface tension (dynes/cm) |
|---|---|
| 15% HCl | 71.2 |
| 15% HCl + 10% ethylene glycol monobutyl ether | 33 |
| 20% Na$_3$HEDTA/pH 4 | 73.6 |
| 20% Na$_3$HEDTA/pH 4 + 10% dipropylene glycol methyl ether | 35.9 |
| 20% Na$_3$HEDTA/pH 4 + 5% dipropylene glycol methyl ether | 45 |

EXAMPLE 3

Corrosion weight loss tests were run in Chandler autoclaves using the procedures described by Jasinski et al., "Inhibiting HCl Corrosion of High Chrome Tubular Steels," NACE Corrosion 1988, # 188 (1988). The corrosivity of the chelating agent, 20 weight percent Na$_3$HEDTA (adjusted to a pH of either 2.5 or 4 with HCl), was tested at 149° C. for a protection time of 6 hours in contact with N80 and 13% Cr steels (commonly used in the oil-field) in the presence of two mutual solvents. The same inhibitor was used at the same concentration in each test as in the tests of Example 1 and the amount of mutual solvent used was 5 volume percent in each case in which it was used. Corrosion rates were measured and are given in pounds/square foot. The results are shown in Table 3.

TABLE 3

| Mutual Solvent | N80 pH 2.5 149° C. | 13% Cr pH 2.5 149° C. | N80 pH 2.5 204° C. | 13% Cr pH 2.5 204° C. | N80 pH 4 149° C. | 13% Cr pH 4 149° C. | N80 pH 4 204° C. | 13% Cr pH 4 204° C. |
|---|---|---|---|---|---|---|---|---|
| None | 0.005 | 0.008 | 0.010 | 0.017 | 0.002 | 0.006 | 0.038 | 0.111 |
| Ethylene glycol monobutyl ether | 0.028 | 0.084 | 0.156 | 0.154 | 0.005 | 0.035 | 0.011 | 0.014 |
| Dipropylene glycol methyl ether | 0.005 | 0.017 | 0.080 | 0.105 | 0.003 | 0.006 | 0.014 | 0.027 |

It can be seen that except for the experiments at pH 4 and 204° C. the corrosion rate was lower when the mutual solvent was dipropylene glycol methyl ether than when it was ethylene glycol monobutyl ether. In most cases the difference was dramatic.

EXAMPLE 4

Solubility tests were run with an acid: a mixture of 13 weight percent citric acid, 5 weight percent, ammonium bifluoride, 2.5 weight percent boric acid, and 4 weight percent HCl, with the remainder as water (called "Acid") and a chelant: 20 weight percent NA$_3$HEDTA and about 7 weight percent HCl to give a pH of 4.0 (called "chelant"). Mixtures of the acid or the chelant were made with mutual solvent candidates in either 90/10 or 95/5 volume percent ratios of acid or chelant to mutual solvent candidate. They were mixed thoroughly and left to separate (at room temperature) for about 12 hours. They were rated "pass' or 'fail" based on the absence or presence of two liquid layers. Experiments were not run at 5 volume percent if the mutual solvent candidate passed the test at 10 volume percent. Results are shown in Table 4.

TABLE 4

| Mutual Solvent Candidate | Acid | | Chelant | |
|---|---|---|---|---|
| | 90/10 | 95/5 | 90/10 | 95/5 |
| Diethylene glycol diethyl ether | Pass | | Fail | Pass |
| Diethylene glycol ethyl ether | Pass | | Pass | |
| Dipropylene glycol butyl ether | Fail | Fail | Fail | Fail |
| Dipropylene glycol methyl ether acetate | Pass | | Fail | Fail |
| Dipropylene glycol propyl ether | Pass | | Fail | Fail |
| Ethylene glycol diethyl ether | Pass | | Fail | Fail |
| Ethylene glycol dimethyl ether | Pass | | Pass | |
| Ethylene glycol methyl ether acrylate | Pass | | Fail | Fail |
| Ethylene glycol monoacetate | Pass | | Pass | |
| Propylene glycol butyl ether | Fail | Pass | Fail | Fail |
| Propylene glycol methyl ether | Pass | | Pass | |
| Propylene glycol methyl ether acetate | Pass | | Fail | Fail |
| Dipropylene glycol methyl ether | Pass | | Pass | |
| Ethylene glycol monobutyl ether | Fail | Fail | Fail | Fail |

We claim:

1. A treating composition comprising:
a first component selected from the group consisting of an aminopolycarboxylic acid chelating agent selected from the group consisting of ethylenediamine tetraacetic acid (EDTA), hydroxyethylethylenediamine triacetic acid (HEDTA), diethylenetriamine pentaacetic acid (DTPA), hydroxyethyliminodiacetic acid (HEIDA), nitrilotriacetic acid (NTA), and their K, Na, $NH_4$ or amine salts, and mixtures thereof, wherein said chelating agent is present in an amount of from 20% to 30% by weight of said composition; and mixtures of said aminopolycarboxylic acid chelating agents with an acid selected from the group consisting of hydrochloric, sulfuric, phosphoric, hydrofluoric, formic, acetic, boric, citric, malic, tartaric, and maleic acids and mixtures thereof; and
a mutual solvent selected from the group of compounds having a first formula:

$$R_1\text{—O—}CH_2\text{—}CH_2\text{—O—}R_2$$

wherein in said first formula $R_1$ and $R_2$ are the same or different and are hydrogen, methyl, acetate, or ethyl provided that $R_1$ and $R_2$ are not both hydrogen and provided that the total number of carbons in both $R_1$ and $R_2$ is not more than 2, a second formula:

$$R_1\text{—O—}CH_2\text{—}CH_2\text{—O—}CH_2\text{—}CH_2\text{—O—}R_2$$

wherein in said second formula $R_1$ and $R_2$ are the same or different and are hydrogen, methyl, acetate, acrylate, or ethyl provided that $R_1$ and $R_2$ are not both hydrogen, a third formula:

$$R_1\text{—O—}CH_2\text{—}CH(CH_3)\text{—O—}R_2$$

wherein in said third formula $R_1$ and $R_2$ are the same or different and are hydrogen, methyl, acetate, acrylate, ethyl, propyl or butyl provided that if $R_1$ is acrylate, ethyl, propyl or butyl then $R_2$ is hydrogen and provided that, if the first component comprises an aminopolycarboxylic acid chelating agent as the only acid, $R_1$ is hydrogen and $R_2$ is methyl or acetate, and a fourth formula:

$$R_1\text{—O—}CH_2\text{—}CH(CH_3)\text{—O—}CH_2\text{—}CH(CH_3)\text{—O—}R_2$$

wherein in said fourth formula $R_1$ and $R_2$ are the same or different and are hydrogen, methyl, acetate, acrylate, ethyl, or propyl provided that if $R_1$ is propyl then $R_2$ is hydrogen and provided that, if the first component comprises an aminopolycarboxylic acid chelating agent as the only acid, $R_1$ is hydrogen and $R_2$ is methyl or acetate; and mixtures thereof.

2. The composition of claim 1 wherein the acid is selected from citric acid, hydrofluoric acid, and boric acid.

3. The composition of claim 1 wherein the aminopolycarboxylic acid is trisodium hydroxyethylethylenediamine triacetate.

4. The composition of claim 3 wherein the pH is between 2 and 4.

5. The composition of claim 1 wherein the mutual solvent is dipropylene glycol methyl ether.

6. The composition of claim 1 further comprising additives selected from the group consisting of corrosion inhibitors, iron control agents, surfactants, and mixtures thereof.

7. The composition of claim 1 further comprising a gas or liquefied gas.

8. The composition of claim 1 wherein the treating composition is the continuous phase of an emulsion.

9. The composition of claim 1 wherein the treating composition is the discontinuous phase of an emulsion.

10. A process for removing scale from a solid surface comprising contacting said surface with the composition of claim 1.

11. The process of claim 10 wherein the surface is at least partially oil wet.

12. The process of claim 10 wherein the scale is at least partially oil wet.

13. A process for stimulating fluid production from a wellbore penetrating a subterranean formation comprising injecting the composition of claim 1 into the formation.

14. The process of claim 13 wherein the formation is a carbonate.

15. The process of claim 13 wherein the formation is a sandstone.

16. The process of claim 13 wherein the composition is injected at a pressure sufficient to fracture the formation.

17. The process of claim 13 wherein the formation is at least partially oil wet.

18. A process for removal of oil-based material from a surface comprising contacting the surface with the composition of claim 1.

19. The process of claim 18 wherein the material comprises a solid that is at least partially oil wet and is soluble in the first component.

20. The process of claim 19 wherein the solid is selected from the group consisting of calcium carbonate, hematite, manganese oxide, and barite.

21. The process of claim 19 wherein the material is selected from the group consisting of drilling fluid, completion fluid, stimulation fluid, kill fluid, diverting agent, lost circulation fluid and mixtures thereof.

22. The process of claim 19 wherein the material is filtercake formed from a fluid selected from the group consisting of drilling fluid, completion fluid, stimulation fluid, kill fluid, diverting agent, lost circulation fluid and mixtures thereof.

23. A treating composition comprising:
a first component selected from the group consisting of an acid combination comprising citric acid, hydrofluoric acid, and boric acid and a mixture of this acid combination with an aminopolycarboxylic acid chelating agent selected from the group consisting of ethylenediamine tetraacetic acid (EDTA), hydroxyethylethylenediamine triacetic acid (HEDTA), diethylenetriamine pentaacetic acid (DTPA), hydroxyethyliminodiacetic acid (HEIDA), nitrilotriacetic acid (NTA), and their K, Na, NH$_4$ or amine salts, and mixtures thereof, wherein said chelating agent is present in an amount of from 20% to 30% by weight of said composition; and
a mutual solvent selected from the group of compounds having a first formula:

$$R_1—O—CH_2—CH_2—O—R_2$$

wherein in said first formula $R_1$ and $R_2$ are the same or different and are hydrogen, methyl, acetate, or ethyl provided that $R_1$ and $R_2$ are not both hydrogen and provided that the total number of carbons in both $R_1$ and $R_2$ is not more than 2, a second formula:

$$R_1—O—CH_2—CH_2—O—CH_2—CH_2—O—R_2$$

wherein in said second formula $R_1$ and $R_2$ are the same or different and are hydrogen, methyl, acetate, acrylate, or ethyl provided that $R_1$ and $R_2$ are not both hydrogen, a third formula:

$$R_1—O—CH_2—CH(CH_3)—O—R_2$$

wherein in said third formula $R_1$ and $R_2$ are the same or different and are hydrogen, methyl, acetate, acrylate, ethyl, propyl or butyl provided that if $R_1$ is acrylate, ethyl, propyl or butyl then $R_2$ is hydrogen and provided, if the first component comprises an aminopolycarboxylic acid chelating agent, that $R_1$ is hydrogen and $R_2$ is methyl or acetate, and a fourth formula:

$$R_1—O—CH_2—CH(CH_3)—O—CH_2—CH(CH_3)—O—R_2$$

wherein in said fourth formula $R_1$ and $R_2$ are the same or different and are hydrogen, methyl, acetate, acrylate, ethyl, or propyl provided that if $R_1$ is propyl then $R_2$ is hydrogen and provided that, if the first component comprises an aminopolycarboxylic acid chelating agent, $R_1$ is hydrogen and $R_2$ is methyl or acetate; and mixtures thereof.

24. The composition of claim 23 wherein the treating composition is the discontinuous phase of an emulsion.

* * * * *